J. MATNEY.
PLOW.
APPLICATION FILED MAR. 13, 1916.
1,192,664.
Patented July 25, 1916.
FIG_1_
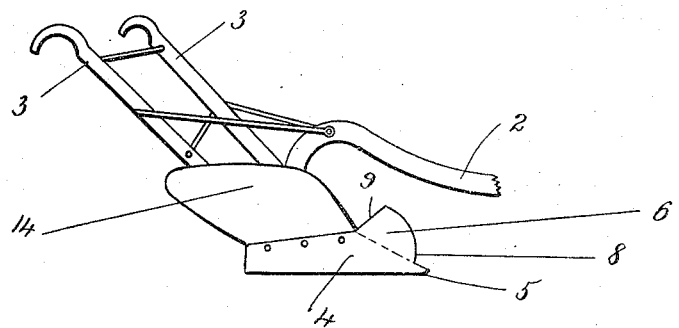
FIG_2_
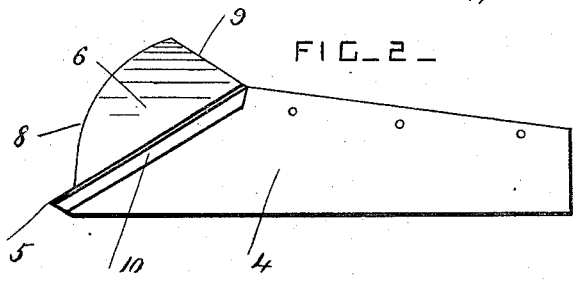
FIG_3_
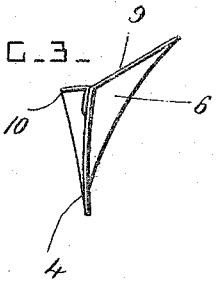
FIG_4_
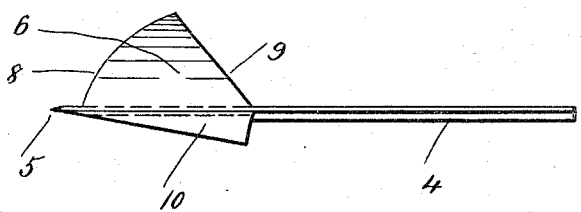
Inventor.
James Matney
by Herbert W. Jenner.
Attorney.

UNITED STATES PATENT OFFICE.

JAMES MATNEY, OF LIVINGSTON, MONTANA, ASSIGNOR OF ONE-HALF TO ELWOOD ROBERTS, OF LIVINGSTON, MONTANA.

PLOW.

1,192,664.      Specification of Letters Patent.      Patented July 25, 1916.

Application filed March 13, 1916. Serial No. 83,851.

*To all whom it may concern:*

Be it known that I, JAMES MATNEY, a citizen of the United States, residing at Livingston, in the county of Park and State of Montana, have invented certain new and useful Improvements in Plows; and I do hereby declare the following to be a full, clear, and exact description of the invention, such as will enable others skilled in the art to which it appertains to make and use the same.

This invention relates to plows, and more particularly to those used for working in sod; and it consists in the novel construction and combination of the parts hereinafter fully described and claimed.

In the drawings, Figure 1 is a perspective view of a plow constructed according to this invention. Fig. 2 is a detail rear view of the plow share, drawn to a larger scale. Fig. 3 is an end view, and Fig. 4 is a plan view, of the plow share.

The plow has a beam 2 and handles 3 of any approved construction. The plow share 4 has a point 5 of approved shape at its front end, and the main portion of landside of the share is very slightly concave on its front side. At the upper part of its front end portion, close behind the point 5, the share has a laterally curved wing 6. The base of this wing is arranged at an angle of about thirty degrees with the horizontal, and it extends upwardly and rearwardly from the point. Its front edge 8 is curved and is sharpened, and its rear edge 9 is inclined downwardly and rearwardly, so that its overhanging middle part tapers to a point or angle of about ninety degrees.

A triangular cutter 10 is welded onto the plow share at the base of the curved wing. This cutter projects on the opposite side of the share from the wing, and it extends from the point 5 upwardly and rearwardly for the full length of the base of the wing. The cutter is triangular in form and is widest at the rear end and tapers to a point in front. The lower side of the cutter is slightly concave, and it is arranged at about an angle of ninety degrees with the share.

The mold board 14 is secured at the top of the plow share to the rear of the cutter, and is of approved form.

This plow is used for cutting sod such as alfalfa and timothy. It cuts the sod in angular form, releasing it from fibers, and turns over the sod so that it lies flat on the ground instead of on edge.

What I claim is:

In a plow, a plow share provided at its front end portion with an overhanging wing having a curved front edge and which projects laterally away from the landside and which has its base or line of juncture with the share arranged at an acute angle with the horizontal and extending upwardly and rearwardly from the share point, and a triangular fin or cutter which projects laterally toward the landside from the said line of juncture of the wing with the share, said fin or cutter having a point at its front and lower end which is arranged adjacent to the share point.

In testimony whereof I have affixed my signature.

JAMES MATNEY.

Copies of this patent may be obtained for five cents each, by addressing the "Commissioner of Patents, Washington, D. C."